US011299027B2

(12) United States Patent
Qiu et al.

(10) Patent No.: US 11,299,027 B2
(45) Date of Patent: Apr. 12, 2022

(54) POWER SYSTEM FOR HYBRID VEHICLES

(71) Applicant: NINGBO UMD AUTOMATIC TRANSMISSION CO., LTD., Zhejiang (CN)

(72) Inventors: Zhiling Qiu, Ningbo (CN); Tejinder Singh, Ningbo (CN); Jun Fu, Ningbo (CN); Choonghyeo Kim, Ningbo (CN); Daguo Luo, Ningbo (CN); Xiaozhe Lin, Ningbo (CN); Ruiping Wang, Ningbo (CN)

(73) Assignee: NINGBO UMD AUTOMATIC TRANSMISSION CO., LTD., Zhejiang (CN)

( * ) Notice: Subject to any disclaimer, the term of this patent is extended or adjusted under 35 U.S.C. 154(b) by 0 days.

(21) Appl. No.: 17/259,103

(22) PCT Filed: Mar. 14, 2019

(86) PCT No.: PCT/CN2019/078181
§ 371 (c)(1),
(2) Date: Jan. 8, 2021

(87) PCT Pub. No.: WO2020/010869
PCT Pub. Date: Jan. 16, 2020

(65) Prior Publication Data
US 2021/0291637 A1  Sep. 23, 2021

(30) Foreign Application Priority Data

Jul. 9, 2018 (CN) .......................... 201810746435.9
Jul. 9, 2018 (CN) .......................... 201821080325.5

(51) Int. Cl.
*B60K 6/547* (2007.10)
*B60K 6/365* (2007.10)
(Continued)

(52) U.S. Cl.
CPC ................ *B60K 6/365* (2013.01); *B60K 6/38* (2013.01); *B60K 6/547* (2013.01); *F16H 3/663* (2013.01);
(Continued)

(58) Field of Classification Search
CPC .......... B60K 6/00–547; B60K 1/00–02; F16H 3/72–728; F16H 2200/202–2028; F16H 2200/2035–2061
See application file for complete search history.

(56) References Cited

U.S. PATENT DOCUMENTS 7,645,206 B2 * 1/2010 Holmes ................... F16H 3/728
475/5
2004/0058769 A1 * 3/2004 Larkin .................. B60W 10/08
475/5
(Continued)

FOREIGN PATENT DOCUMENTS

CN       102114770 A     7/2011
CN       102310756 A     1/2012
(Continued)

OTHER PUBLICATIONS

Wang, Hybrid power transmission, 2013, raw translation of CN103057395, 19 pages (Year: 2013).*
(Continued)

*Primary Examiner* — Ernesto A Suarez
*Assistant Examiner* — Lillian T Nguyen
(74) *Attorney, Agent, or Firm* — Alston & Bird LLP

(57) ABSTRACT

The present invention provides a power system for a hybrid vehicle, relating to the field of hybrid vehicles. The power system for a hybrid vehicle adopts a first planetary gear mechanism with two sun gears, the first sun gear rotates with an input shaft, the second sun gear and the input shaft are independent of each other, and the second sun gear achieves (Continued)

different motion states through a second brake or/and a second clutch, and cooperates with a first brake to provide different transmission ratios of four to six gears when an engine and motors are in driving, so that the power system is simple in structure and low in cost, and the fuel economy and acceleration dynamic performance of the power system are improved.

6 Claims, 2 Drawing Sheets

(51) Int. Cl.
  *B60K 6/38* (2007.10)
  *F16H 3/66* (2006.01)
  *B60K 6/48* (2007.10)
(52) U.S. Cl.
  CPC ............... *B60K 2006/4825* (2013.01); *F16H 2200/0021* (2013.01); *F16H 2200/201* (2013.01)

(56) References Cited

U.S. PATENT DOCUMENTS

| | | | |
|---|---|---|---|
| 2004/0176203 A1* | 9/2004 | Supina | B60W 10/06 475/8 |
| 2009/0275439 A1* | 11/2009 | Kersting | F16H 3/728 475/5 |
| 2011/0160015 A1 | 6/2011 | Ren et al. | |
| 2011/0256974 A1* | 10/2011 | Okuwaki | B60K 6/365 475/5 |
| 2015/0011350 A1 | 1/2015 | Mellet et al. | |
| 2015/0273999 A1 | 10/2015 | Scholz | |
| 2016/0288779 A1* | 10/2016 | Kotloski | B60K 6/442 |

FOREIGN PATENT DOCUMENTS

| | | | | |
|---|---|---|---|---|
| CN | 102463886 A | | 5/2012 | |
| CN | 102941801 A | | 2/2013 | |
| CN | 103057395 A | | 4/2013 | |
| CN | 108909433 A | | 11/2018 | |
| DE | 102012024174 A1 | | 6/2014 | |
| EP | 1279543 A2 | * | 1/2003 | ............. F16H 3/728 |
| JP | H01112057 A | | 4/1989 | |
| JP | 2010234830 A | * | 10/2010 | ............. F16H 3/728 |

OTHER PUBLICATIONS

International Search Report for PCT/CN2019/078181 dated May 31, 2019 (7 pages).
Written Opinion of the International Searching Authority for PCT/CN2019/078181 (ISA/CN) dated May 31, 2019 (5 pages).
Extended European Search Report for EP Application No. 19835046.4 dated Jun. 24, 2021 (4 pages).
$1^{st}$ Office Action for EP Application No. 19835046.4 dated Jun. 30, 2021 (10 pages).

* cited by examiner

POWER SYSTEM FOR HYBRID VEHICLES

CROSS-REFERENCE TO RELATED APPLICATIONS

The present application is a national phase entry of International Application No. PCT/CN2019/078181, filed Mar. 14, 2019, which claims priority to Chinese Patent Application No. 201810746435.9, filed Jul. 9, 2018 and Chinese Patent Application No. 201821080325.5, filed Jul. 9, 2018, which are incorporated herein by reference in their entirety.

TECHNICAL FIELD

The present invention relates to the field of hybrid vehicles, and more particularly relates to a power system for a hybrid vehicle.

BACKGROUND

At present, the use of gasoline-electric hybrid power as a vehicle power source has increasingly become the mainstream trend of vehicle development. A gasoline-electric hybrid vehicle usually includes an engine with a smaller displacement than a traditional engine and one or two motors. Under normal circumstances, when driving at low speeds (such as urban roads) or requiring frequent starting, the vehicle can be driven only by the motor(s); and when high-speed driving is required, only the engine can be used to drive the vehicle to save energy. In the prior art, hybrid modes of gasoline-electric hybrid vehicles mainly include a serial mode, a parallel mode and a serial-parallel mode.

A power system in an existing hybrid vehicle has a relatively simple structure and poor adaptability.

SUMMARY OF THE INVENTION

One objective of the present invention is to provide a power system for a hybrid vehicle with a simple structure and strong adaptability.

A further objective of the present invention is to enable the power system to provide a larger reduction ratio to effectively reduce the size of a motor or improve the acceleration performance of a vehicle.

On the one hand, the present invention provides a power system for a hybrid vehicle. The power system includes an engine, a first motor, a second motor, a first planetary gear mechanism, an input shaft, a first clutch, and a first brake.

The engine is connected to the first motor. The first clutch is arranged between the first motor and the input shaft to cut off or connect power transmission between the first motor and the input shaft through the first clutch. The second motor is arranged on the input shaft to drive the input shaft to rotate.

The first planetary gear mechanism includes a first sun gear, a first set of planetary gears, a second set of planetary gears, a first gear ring, and a first planetary carrier shared by the first set of planetary gears and the second set of planetary gears. External gears of the second set of planetary gears are respectively meshed with external gears of the first set of planetary gears and an internal gear of the first gear ring. The first sun gear is arranged on the input shaft to enable the first sun gear to rotate with the input shaft. The first gear ring is configured to transmit power output by the power system. The first brake is arranged between the first planetary carrier and a housing of the power system. The first planetary gear mechanism further includes a second sun gear coaxial with the first sun gear. The second sun gear and the input shaft are independent of each other, and an external gear of the second sun gear is meshed with the external gears of the second set of planetary gears.

The power system further includes a second brake or/and a second clutch. The second brake is configured to fix the second sun gear when the second brake is in a braking state, so as to enable the second sun gear to remain relatively static with the housing of the power system. The second clutch is configured to enable the second sun gear to rotate with the input shaft when the second clutch is in an engaged state.

Optionally, the second brake is arranged between the second sun gear and the housing of the power system.

Optionally, the second clutch is arranged between the input shaft and the second sun gear.

Optionally, the second clutch is arranged between a rotor of the second motor and the second sun gear.

Optionally, the second motor is connected to the input shaft through a second planetary gear mechanism, and the second planetary gear mechanism includes a third sun gear, at least one set of planetary gears, a second gear ring, and a second planetary carrier.

Optionally, the third sun gear is fixed on a rotor of the second motor and rotates together with the rotor. The second planetary carrier is fixed to the housing. The second motor transmits power to the input shaft through the second gear ring.

Optionally, the third sun gear is fixed to the housing. The second gear ring is fixed on a rotor of the second motor and rotates together with the rotor. The second motor transmits power to the input shaft through the second planetary carrier.

On the other hand, the present invention further provides a power system for a hybrid vehicle. The power system includes an engine, a first motor, a second motor, a first planetary gear mechanism, a second planetary gear mechanism, an input shaft, a first clutch, a second clutch, a first brake, and a second brake.

The engine is connected to the first motor. The first clutch is arranged between the first motor and the input shaft. The first clutch is capable of cutting off or connecting power transmission between the engine and/or the first motor and the input shaft. The second motor is arranged on the input shaft to drive the input shaft to rotate.

The first planetary gear mechanism includes a first sun gear, a first set of planetary gears, a first gear ring, and a first planetary carrier. The first sun gear is arranged on the input shaft to enable the first sun gear to rotate with the input shaft. The second planetary gear mechanism includes a second sun gear, a second set of planetary gears, a second gear ring, and a second planetary carrier. The second sun gear and the input shaft are independent of each other. The second gear ring is fixedly connected to the first planetary carrier. The first gear ring is fixedly connected to the second planetary carrier. The second gear ring is configured to transmit power output by the power system.

The first brake is arranged between the second planetary carrier and a housing of the power system. The second brake is arranged between the second sun gear and the housing of the power system. The second clutch is arranged between the second sun gear and the input shaft.

Optionally, the second motor is connected to the input shaft through a third planetary gear mechanism, and the third planetary gear mechanism includes a third sun gear, at least one set of planetary gears, a third gear ring, and a third planetary carrier.

Optionally, the third sun gear is fixed on a rotor of the second motor and rotates together with the rotor, the third planetary carrier is fixed on the housing, and the second motor transmits power to the input shaft through the third gear ring; or the third sun gear is fixed to the housing, the third gear ring is fixed on the rotor of the second motor and rotates together with the rotor, and the second motor transmits power to the input shaft through the third planetary carrier.

The power system for a hybrid vehicle, provided by the present invention, adopts the first planetary gear mechanism with two sun gears. The first sun gear rotates with the input shaft, the second sun gear and the input shaft are independent of each other, and the second sun gear achieves different motion states through the second brake or/and the second clutch, and cooperates with the first brake to provide different transmission ratios, so that the power system is simple in structure, low in cost and stronger in adaptability.

Further, the second motor of the present invention is connected to the input shaft through the second planetary gear mechanism, and the planetary gear mechanism can reduce the speed of the second motor and increase the torque to effectively reduce the size of the second motor or improve the acceleration performance of the vehicle.

The power system for a hybrid vehicle, provided by the present invention, adopts the first planetary gear mechanism and the second planetary gear mechanism that cooperate with each other. The first sun gear rotates with the input shaft, the second sun gear and the input shaft are independent of each other, and the second sun gear achieves different motion states through the second brake or/and the second clutch, and cooperates with the first brake to provide different transmission ratios, so that the power system is simple in structure, low in cost and stronger in adaptability.

According to the following detailed descriptions of specific embodiments of the present invention in conjunction with the drawings, those skilled in the art will more clearly understand the above and other objectives, advantages and features of the present invention.

BRIEF DESCRIPTION OF THE DRAWINGS

Some specific embodiments of the present invention will be described in detail below with reference to the drawings by way of example and not limitation. The same reference numbers in the drawings mark the same or similar components or parts. Those skilled in the art should understand that the drawings are not necessarily drawn in scale. In the drawings.

DETAILED DESCRIPTION OF THE INVENTION

Embodiment I

Figure 1:
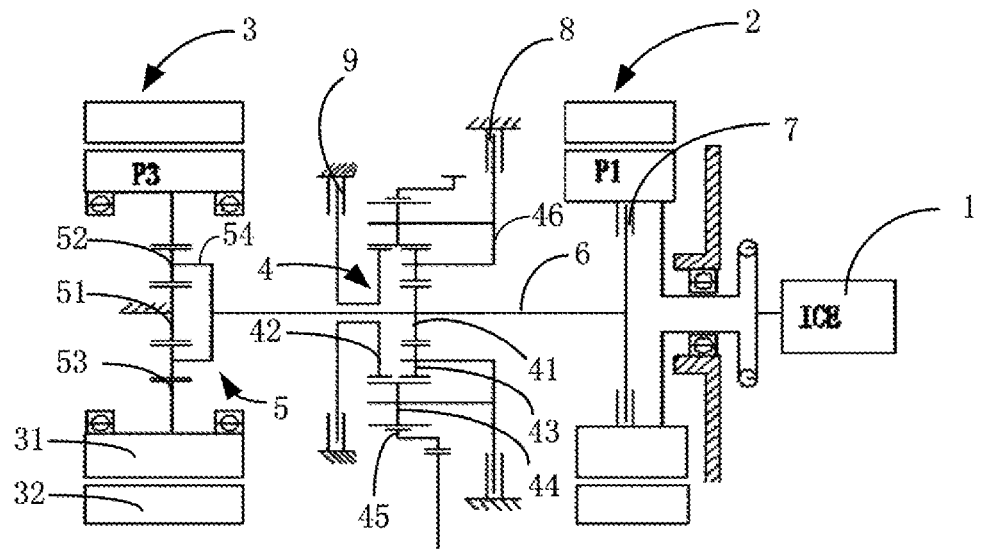
FIG. 1 is a schematic structural diagram of a power system according to an embodiment of the present invention.

FIG. 1 is a schematic structural diagram of a power system according to an embodiment of the present invention. As shown in FIG. 1, the power system for a hybrid vehicle in the present embodiment includes: an engine 1, a first motor 2, a second motor 3, a first planetary gear mechanism 4, an input shaft 6, a first clutch 7, and a first brake 8. The engine 1 (ICE), the first motor 2 (P1) and the second motor 3 (P3) constitute a power source of the power system of the present invention. Preferably, the first motor 2 is an Integrated Starter and Generator (ISG), and the second motor 3 is a high-power drive motor (TM motor). The first clutch 7 and a second brake 9 are configured to realize the connection and cutting-off of the transmission power of the power system of the present invention.

Of course, those skilled in the art can understand that the power system for a hybrid vehicle may further include, for example, a shock absorber between the engine 1 and the first motor 2, a differential mechanism for realizing different speeds when wheels turn, a drive axle for driving the wheels, and the wheels for enabling the vehicle to run. The power system of the present invention can be directly connected with the above-mentioned system in a conventional connection mode to realize the running of the vehicle. These are not the focus of the technical solution of the present invention, and are also well-known techniques to those skilled in the art, so they will not be repeated in this specification. The specific connection mode and working principle of each element of the power system of the present invention will be described in detail and preferably hereinafter.

With continuing reference to FIG. 1, the engine 1 is connected to the first motor 2, and a crankshaft of the engine 1 is connected to a rotor of the second motor 3 through the shock absorber. The first clutch 7 is arranged between a rotor of the first motor 2 and the input shaft 6, and the first clutch 7 is capable of cutting off or connecting power transmission between the engine 1 and/or the first motor 2 and the input shaft 6. The first motor 2 has two functions of power generation and driving, and the structure and working principle of the first motor have been described in detail in many related patents, and will not be repeated here. The engine 1 is directly connected to the first motor 2. The first motor 2 can start the engine 1, and the engine 1 directly drags the first motor 2 to efficiently generate power. The electric energy of the first motor 2 is directly transmitted to the motor for driving to reduce the conversion loss of the electric energy to chemical energy.

The second motor 3 is arranged on the input shaft 6 to drive the input shaft 6 to rotate. The second motor 3 may also be used as a generator to recover the braking energy of the vehicle. In order to improve gear transmission accuracy and NVH performance, three prime motors are preferably arranged coaxially. In addition to the differential mechanism, the entire gearbox has only two shafts. Further, the engine 1 is connected to the second motor 3 through the first clutch 7. When the second motor 3 is in driving individually, the clutch is disengaged, and the drag force of the engine 1 will not hinder the driving of the second motor 3, thereby improving the motor driving efficiency.

The first planetary gear mechanism 4 includes a first sun gear 41, a first set of planetary gears 43, a second set of planetary gears 44, a first gear ring 45, and a first planetary carrier 46 shared by the first set of planetary gears 43 and the second set of planetary gears 44. External gears of the second set of planetary gears 44 are respectively meshed with external gears of the first set of planetary gears 43 and an internal gear of the first gear ring 45, and the external gears of the first set of planetary gears 43 are not only meshed with the external gears of the second set of planetary gears 44 but also meshed with an external gear of the first sun gear 41. The first sun gear 41 is arranged on the input shaft 6 to enable the first sun gear 41 to rotate with the input shaft 6. Specifically, the first sun gear 41 may be connected to the input shaft 6 in a manner of spline connection. The first gear ring 45 is configured to output power. Specifically, an external gear of the first gear ring 45 is meshed with a driven wheel on an output shaft, so that the input power received by the first planetary gear mechanism 4 is shifted and then transmitted to the output shaft. The first brake 8 is arranged between the first planetary carrier 46 and a housing of the power system, and the first brake 8 can keep the first planetary carrier 46 and the housing relatively static.

With continuing reference to FIG. 1, the first planetary gear mechanism 4 further includes a second sun gear 42 coaxial with the first sun gear 41, and the second sun gear 42 and the input shaft 6 are independent of each other. Specifically, the first sun gear 41 and the second sun gear 42 are coaxially arranged, and an external gear of the second sun gear 42 is meshed with the external gears of the second set of planetary gears 44. In order to make the second sun gear 42 have different motion states, the power system is also provided with a second brake 9. The second brake 9 is arranged between the second sun gear 42 and the housing of the power system. The second brake 9 is configured to fix the second sun gear 42 when the second brake 9 is in an engaged state, so as to enable the second sun gear to remain relatively static with the housing of the power system. The second brake 9 may also be arranged between a stator 32 of the second motor 3 and the second sun gear 42.

With continuing reference to FIG. 1, in another preferred embodiment, the second motor 3 is connected to the input shaft 6 through a second planetary gear mechanism 5, and the second planetary gear mechanism 5 includes a third sun gear 51, at least one set of planetary gears, a second gear ring 53, and a second planetary carrier 54. In the present embodiment, a set of planetary gears, which are a third set of planetary gears 52, are arranged. In other embodiments, multiple sets of planetary gears may also be arranged. The second planetary gear mechanism 5 is arranged between the second motor and the input shaft 6, which can change the output speed of the motor to change the torque. This structure is suitable for a hybrid vehicle with the second motor 3 having a larger power and a high-efficiency speed range closer to the high-efficiency speed range of the engine 1.

In the present embodiment, the third sun gear 51 is fixed to the housing, the second gear ring 53 is fixed on the rotor 31 of the second motor 3 and rotates together with the rotor, and the second motor 3 transmits power to the input shaft 6 through the second planetary carrier 54. As shown in FIG. 1, the second motor 3 is started. Since the third sun gear 51 in the second planetary gear mechanism 5 is fixed, the rotor 31 of the second motor 3 drives the second gear ring 53 to rotate. At this time, the output rotation speed of the second planetary carrier 54 is:

$$\frac{n_r}{n_c} = \frac{a_1 + 1}{a_1}.$$

In the above formula, $n_r$ is the rotation speed of the second gear ring 53, namely, the second motor 3, $n_c$ is the output rotation speed of the second planetary carrier 54 of the second planetary gear mechanism 5, $\alpha_1$ is a gear ratio of the second gear ring 53 to the third sun gear 51, and the value of $\alpha_1$ is generally set between 2 and 3. It can be seen from the above formula that the second planetary gear mechanism 5 reduces the output rotation speed of the second motor 3 by about ⅓, that is, increases the torque by 50%, thereby effectively reducing the size of the motor or improving the acceleration performance of the vehicle.

In order to require a larger reduction ratio, the second motor 3 and the second planetary gear mechanism 5 may be connected in different manners. In a preferred embodiment, the second planetary gear mechanism 5 includes a third sun gear 51, at least one set of planetary gears, a second gear ring 53, and a second planetary carrier 54. In the present embodiment, at least one set of planetary gears, which are called the third set of planetary gears 52, are arranged. In other embodiments, multiple sets of planetary gears may be arranged, which will not be described in detail here. The third sun gear 51 is fixed on the rotor of the second motor 3 and rotates together with the rotor, an external gear of the third sun gear 51 is meshed with external gears of the third set of planetary gears 52, the second planetary carrier is fixed to the housing, the external gears of the third set of planetary gears 52 are meshed with an internal gear of the second gear ring 53, the second gear ring 53 is connected to the input shaft 6, and the second motor 3 transmits power to the input shaft 6 through the second gear ring 53. This structure is suitable for a hybrid vehicle with the second motor 3 having a smaller power, a smaller space and a higher rotation speed.

For a plug-in hybrid vehicle with the second motor 3 having a large power and a large battery power, the second planetary gear mechanism 5 for the second motor 3 may be omitted to save the cost.

The above is a detailed description of the structure of the power system, and the working mode of the power system is further described below.

The power system shown in FIG. 1 is of two-gear transmission. Since the planetary gear mechanism plays a transmission role in the power system, a speed ratio may be abstracted as a ratio between the rotation speed of the input shaft 6 and the rotation speed of the differential mechanism. Hereinafter, taking the embodiment shown in FIG. 1 as an example, the working mode of the power system of the present invention will be further explained. The power system of the present embodiment may be switched among different operating modes and operating gears according to actual miming conditions.

When the engine 1 is started and used for charging, since the crankshaft of the engine 1 is directly connected to the rotor of the first motor 2, the first motor 2 can rotate to start the engine 1. On the contrary, the engine 1 can operate to drive the first motor 2 to charge batteries. In the present embodiment, the main function of the engine 1 at a low speed is to generate power, and the rotation speed of the first motor 2 should be consistent with that of the engine 1, therefore, the high-efficiency rotation speed ranges of the engine 1 and the first motor 2 should be designed to be consistent.

In the present embodiment, the hybrid vehicle has two gears. When the first brake 8 is engaged and the second brake 9 is disengaged, the first planetary carrier 46 of the first planetary gear mechanism 4 is fixedly connected to the housing of the power system through the engagement of the first brake 8, and the first gear ring 45 transmits power to the output shaft. At this time, the power system has a speed ratio, and the vehicle is in a first gear mode, which can be used to assist the motor to start or accelerate. In the first gear, a gear ratio of the first gear ring 45 to the first sun gear 41 is generally set between 2 and 3. When the second brake 9 is engaged and the first brake 8 is disengaged, the second sun gear 42 is fixedly connected to the housing of the power system through the engagement of the second brake 8, and the first gear ring 45 transmits power to the output shaft. At this time, the vehicle is in a second gear mode, which can be used to drive the vehicle to cruise at a high speed or to efficiently generate power.

In the first gear or the second gear, if only the second motor 3 is in a working state, it is in a pure electric first gear or second gear; if only the engine 1 is in a working state, it is in an engine first gear or second gear; if the engine 1 and the second motor 3 are in a working state and the first motor 2 is in a stopping state, it is in a hybrid parallel first gear or second gear; and if the engine 1, the first motor 2 and the second motor 3 are all in a working state, the engine 1 drives the first motor 2 to generate power, and after the first motor 2 generates power, the electric energy is stored in a battery management unit or directly supplied to the second motor 3, it is in a hybrid serial first gear or second gear. The gear shift process of the vehicle is as follows: when the vehicle speed is higher than a preset value, the first brake 8 is disengaged, the second brake 9 is engaged, the speed ratio of the power system is changed, and the gear shift is completed. Specifically, the power system of the present embodiment has four gears: an electric first gear, an electric second gear, an engine first gear, and an engine second gear. The power system of the present invention can realize the above-mentioned multiple control modes and improve the fuel economy of the vehicle.

In a single driving mode of the engine 1, the first clutch 7 is engaged, and the engine 1 can transmit all or part of the power to the input shaft 6; and in the single driving mode of the engine 1, a certain power can also be distributed to charge batteries through the first motor 2. According to the operating conditions of the vehicle, the remaining power of the engine 1 can be distributed to the first motor 2, so as to improve the fuel economy. When a throttle is larger, the torque of the first motor 2 can be controlled to be 0, and all the power of the engine 1 can be distributed to the input shaft 6, so as to ensure the starting acceleration of the vehicle.

In a single driving mode of the second motor 3 (pure electric mode), the first clutch 7 is disengaged, the first brake 8 or the second brake 9 is engaged, and the second motor 3 drives the input shaft 6.

In a simultaneous driving mode of the engine 1 and the second motor 3 (including a parallel mode and a serial mode), the first clutch 7 is engaged, the engine and the second motor 3 are started at the same time, the torque of the engine 1, from which the torque of dragging the first motor 2 is subtracted, is transmitted to the input shaft 6 through the first clutch 7. The torque of the second motor 3 is also superimposed on the input shaft 6 directly or after being amplified through the planetary gear mechanism By means of torque superposition, the output power is increased. If the torque of the first motor 2 is controlled to be 0, at this time, the input shaft 6 can obtain a maximum input torque.

In a vehicle braking energy recovery mode, when the vehicle decelerates for braking or slides, the first brake 8 is engaged, and the inertia of the vehicle drags the first gear ring 45, the first sun gear 41, the input shaft 6 and the rotor of the second motor 3 to generate power through the differential mechanism and the output shaft, so as to realize braking energy recovery. During vehicle energy recovery, preferably, the first gear is used for energy recovery, which is higher in efficiency.

Embodiment II

Figure 2:
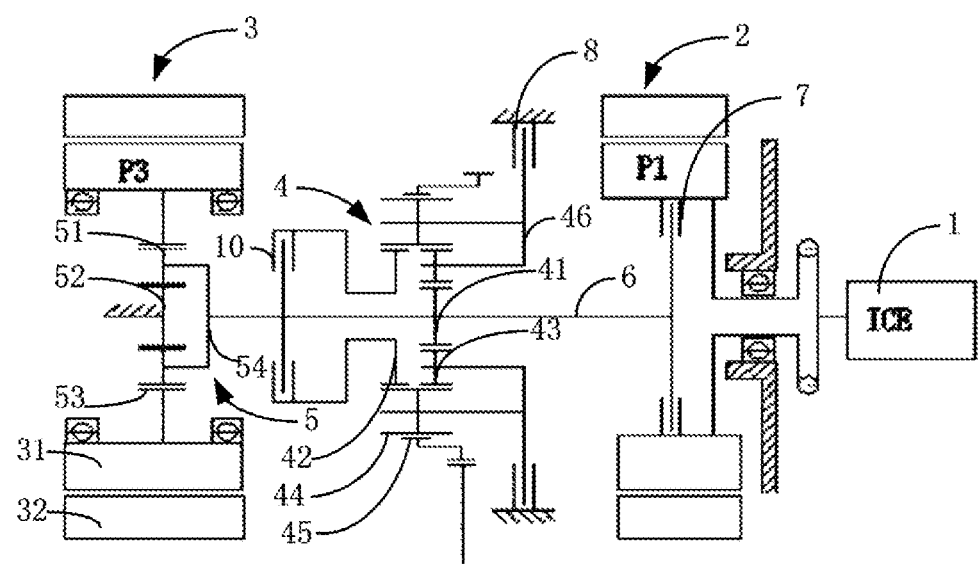
FIG. 2 is a schematic structural diagram of a power system according to another embodiment of the present invention.

FIG. 2 is a schematic structural diagram of a power system according to another embodiment of the present invention. As shown in FIG. 2, in the present embodiment, the basic structure of the power system is not changed except that the second brake 9 in the embodiment shown in FIG. 1 is cancelled and replaced with a second clutch 10. The second clutch 10 is configured to enable the second sun gear 42 to rotate with the input shaft 6 when the second clutch 10 is in an engaged state. The second clutch 10 is arranged between the input shaft 6 and the second sun gear 42. In the present embodiment, the modes that can be realized by the vehicle are the same as those realized in Embodiment I. The only difference is that when the second clutch 10 is engaged, the second sun gear 42 rotates together with the input shaft 6, at this time, the two sun gears rotate together with the input shaft 6, which is equivalent to locking the inside of the first planetary gear mechanism 4, the final transmission ratio of the power system is irrelevant to the first planetary gear mechanism 4, and it is in the second gear.

In other embodiments, the second clutch 10 is arranged between the rotor of the second motor 3 and the second sun gear 42. When the second clutch 10 is arranged between the rotor of the second motor 3 and the second sun gear 42, a rotor of the second clutch 10 is directly connected to the input shaft 6, and the second planetary gear mechanism 5 is no longer needed.

Embodiment III

In other preferred embodiments, the power system further includes a second brake 9 and a second clutch 10. Specifically, the solutions in FIG. 1 and FIG. 2 are merged together. The second brake 9 is configured to fix the second sun gear 42 when the second brake 9 is in a braking state, so as to enable the second sun gear to remain relatively static with the housing of the power system. The second clutch 10 is configured to enable the second sun gear 42 to rotate with the input shaft 6 when the second clutch 10 is in an engaged state. The above structure can realize three gear modes of the vehicle. Specifically, when the first brake 8 is engaged and the second brake 9 and the second clutch 10 are disengaged, the first planetary carrier 46 of the first planetary gear mechanism 4 is fixedly connected to the housing of the power system through the engagement of the first brake 8, and the first gear ring 45 transmits power to the output shaft. At this time, the power system has a speed ratio, and it is in the first gear, which can be used to assist the motor to start or accelerate. In the first gear, the gear ratio of the first gear ring 45 to the first sun gear 41 is generally set between 2 and 3. When the second brake 9 is engaged and the first brake 8 and the second clutch 10 are disengaged, the second sun gear 42 is fixedly connected to the housing of the power system through the engagement of the second brake 9, and the first gear ring 45 transmits power to the output shaft. At this time, the power system has another speed ratio, and it is in the second gear, which can be used to drive the vehicle to cruise at a high speed or to efficiently generate power. When the second clutch 10 is engaged and the first brake 8 and the second brake 9 are disengaged, the second sun gear 42 rotates together with the input shaft 6. At this time, the two sun gears rotate together with the input shaft 6, which is equivalent to locking the inside of the first planetary gear mechanism 4, the final transmission ratio of the power system is irrelevant to the first planetary gear mechanism 4, and it is in a third gear.

Embodiment IV

Figure 3:
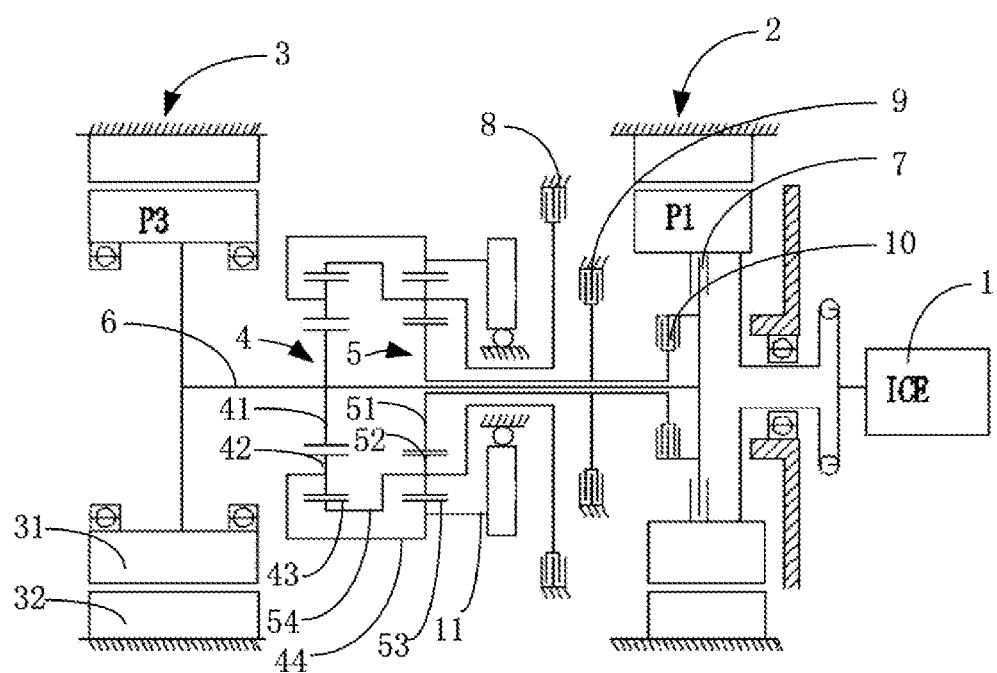
FIG. 3 is a schematic structural diagram of a power system according to yet another embodiment of the present invention.

FIG. 3 is a schematic structural diagram of a power system according to yet another embodiment of the present invention. As shown in FIG. 3, the power system includes an engine 1, a first motor 2, a second motor 3, a first planetary gear mechanism 4, a second planetary gear mechanism 5, an input shaft 6, a first clutch 7, a second clutch 10, a first brake 8, and a second brake 9. The engine 1 is connected to the first motor 2, the first clutch 7 is arranged between the first motor 2 and the input shaft 6, and the first clutch 7 is capable of cutting off or connecting power transmission between the engine 1 and/or the first motor 2 and the input shaft 6. The second motor 3 is arranged on the input shaft 6 to drive the input shaft 6 to rotate. The first brake 8 is arranged between a second planetary carrier 54 and a housing of the power system.

With continuing reference to FIG. 3, the first planetary gear mechanism 4 includes a first sun gear 41, a first set of planetary gears 42, a first gear ring 43, and a first planetary carrier 44. The first sun gear 41 is arranged on the input shaft 6 to enable the first sun gear 41 to rotate with the input shaft 6. An external gear of the first sun gear 41 is meshed with external gears of the first set of planetary gears 42, and the external gears of the first set of planetary gears 42 are also meshed with an internal gear of the first gear ring 43. The second planetary gear mechanism 5 includes a second sun gear 51, a second set of planetary gears 52, a second gear ring 53, and a second planetary carrier 54. The second sun gear 51 and the input shaft 6 are independent of each other. An external gear of the second sun gear 51 is meshed with external gears of the second set of planetary gears 52, and the external gears of the second set of planetary gears 52 are also meshed with an internal gear of the second gear ring 53. The first planetary gear mechanism 4 and the second planetary gear mechanism 5 are connected to each other. Specifically, the second gear ring 53 is fixedly connected to the first planetary carrier 44, the first gear ring 43 is fixedly connected to the second planetary carrier 54, and the second gear ring 53 is configured to transmit power output by the power system. The first brake 8 is arranged between the second planetary carrier 54 and the housing of the power system. The second brake 9 is arranged between the second sun gear 51 and the housing of the power system, or between the second sun gear 51 and a stator 32. The second clutch 10 is arranged between the second sun gear 51 and the input shaft 6.

The above structure can also realize three gear modes of the vehicle. Specifically, when the first brake 8 is engaged and the second brake 9 and the second clutch 10 are disengaged, the second planetary carrier 54 of the second planetary gear mechanism 5 is fixedly connected to the housing of the power system through the engagement of the first brake 8, and the first planetary carrier 44 transmits power to the output shaft. At this time, the power system has a speed ratio, and it is in a first gear, which can be used to assist the motor to start or accelerate. When the second brake 9 is engaged and the first brake 8 and the second clutch 10 are disengaged, the second sun gear 51 is fixedly connected to the housing of the power system through the engagement of the second brake 9, and the second gear ring 53 transmits power to the output shaft. At this time, the power system has another speed ratio, and it is in a second gear, which can be used to drive the vehicle to cruise at a high speed or to efficiently generate power. When the second clutch 10 is engaged and the first brake 8 and the second brake 9 are disengaged, the second sun gear 51 rotates together with the input shaft 6. At this time, the two sun gears rotate together with the input shaft 6, which is equivalent to locking the inside of the first planetary gear mechanism 4, the final transmission ratio of the power system is irrelevant to the first planetary gear mechanism 4, and it is in a third gear. Regarding other operating modes, the principle is the same as that in Embodiment I, and will not be described in detail here.

In a further embodiment, the second motor 3 is connected to the input shaft 6 through a third planetary gear mechanism, and the third planetary gear mechanism includes a third sun gear, at least one set of planetary gears, a third gear ring 5, and a third planetary carrier. Specifically, the third sun gear is fixed on a rotor 31 of the second motor 3 and rotates together with the rotor 31, and the second motor 3 transmits power to the input shaft 6 through the third gear ring. Alternatively, the third sun gear may be fixed to the housing, the third gear ring is fixed on the rotor of the second motor 3 and rotates together with the rotor, and the second motor 3 transmits power to the input shaft 6 through the third planetary carrier.

Further, the hybrid vehicle adopting the power system of the present invention may also be provided with, for example, a lithium battery energy storage system, a battery management system for managing the energy storage system, and the like. Thus, the power of the second motor 3 and the first motor 2 can be directly supplied through the lithium battery energy storage system. Furthermore, the first motor 2 can charge the lithium battery energy storage system through the engine 1. These energy management systems are not the focus of the present invention, and will not be repeated here.

Hereto, those skilled in the art should realize that although multiple exemplary embodiments of the present invention have been shown and described in detail herein, without departing from the spirit and scope of the present invention, many other variations or modifications that conform to the principles of the present invention can still be directly determined or deduced from the contents disclosed in the present invention. Therefore, the scope of the present invention should be understood and deemed to cover all such other variations or modifications.

The invention claimed is:

1. A power system for a hybrid vehicle, characterized in that the power system includes an engine, a first motor, a second motor, a first planetary gear mechanism, an input shaft, a first clutch, and a first brake;
    the engine is connected to the first motor, and the first clutch is arranged between the first motor and the input shaft to cut off or connect power transmission between the first motor and the input shaft through the first clutch; the second motor is arranged on the input shaft to drive the input shaft to rotate;
    the first planetary gear mechanism includes a first sun gear, a first set of planetary gears, a second set of planetary gears, a first gear ring, and a first planetary carrier shared by the first set of planetary gears and the second set of planetary gears; external gears of the second set of planetary gears are respectively meshed with external gears of the first set of planetary gears and an internal gear of the first gear ring, the first sun gear is arranged on the input shaft to enable the first sun gear to rotate with the input shaft, and the first gear ring is configured to transmit power output by the power system; the first brake is arranged between the first planetary carrier and a housing of the power system; the first planetary gear mechanism further includes a second sun gear coaxial with the first sun gear, the second sun gear and the input shaft are independent of each other, and an external gear of the second sun gear is meshed with the external gears of the second set of planetary gears; and the power system further includes a second clutch; the second clutch is configured to enable the second sun gear to rotate with the input shaft when the second clutch is in an engaged state, wherein the second motor is connected to the input shaft through a second planetary gear mechanism, and the second planetary gear mechanism includes a third sun gear, at least one set of planetary gears, a second gear ring, and a second planetary carrier.

2. The power system for a hybrid vehicle according to claim 1, wherein the second clutch is arranged between the input shaft and the second sun gear.

3. The power system for a hybrid vehicle according to claim 1, wherein the second clutch is arranged between a rotor of the second motor and the second sun gear.

4. The power system for a hybrid vehicle according to claim 1, wherein the third sun gear is fixed on a rotor of the second motor and rotates together with the rotor, the second planetary carrier is fixed to the housing, and the second motor transmits power to the input shaft through the second gear ring.

5. The power system for a hybrid vehicle according to claim 1, wherein the third sun gear is fixed to the housing, the second gear ring is fixed on a rotor of the second motor and rotates together with the rotor, and the second motor transmits power to the input shaft through the second planetary carrier.

6. A power system for a hybrid vehicle, characterized in that the power system includes an engine, a first motor, a second motor, a first planetary gear mechanism, a second planetary gear mechanism, an input shaft, a first clutch, a second clutch, a first brake, and a second brake;

the engine is connected to the first motor, and the first clutch is arranged between the first motor and the input shaft to cut off or connect power transmission between the engine and/or the first motor and the input shaft through the first clutch; the second motor is arranged on the input shaft to drive the input shaft to rotate;

the first planetary gear mechanism includes a first sun gear, a first set of planetary gears, a first gear ring, and a first planetary carrier; the first sun gear is arranged on the input shaft to enable the first sun gear to rotate with the input shaft; the second planetary gear mechanism includes a second sun gear, a second set of planetary gears, a second gear ring, and a second planetary carrier; the second sun gear and the input shaft are independent of each other; the second gear ring is fixedly connected to the first planetary carrier, the first gear ring is fixedly connected to the second planetary carrier, and the second gear ring is configured to transmit power output by the power system; and the first brake is arranged between the second planetary carrier and a housing of the power system; and the second brake is arranged between the second sun gear and the housing of the power system, and the second clutch is arranged between the second sun gear and the input shaft.

\* \* \* \* \*